(12) United States Patent
Klinkhammer et al.

(10) Patent No.: US 12,140,422 B2
(45) Date of Patent: Nov. 12, 2024

(54) SET-UP APPARATUS AND METHOD FOR SETTING UP A TOOL FOR PUNCHING OR FORMING SHEET-FORM MATERIALS

(71) Applicant: TRUMPF Werkzeugmaschinen SE + Co. KG, Ditzingen (DE)

(72) Inventors: Marc Klinkhammer, Ditzingen (DE); Simon Ockenfuss, Renningen (DE)

(73) Assignee: TRUMPF Werkzeugmaschinen SE + Co. KG, Ditzingen (DE)

( * ) Notice: Subject to any disclaimer, the term of this patent is extended or adjusted under 35 U.S.C. 154(b) by 397 days.

(21) Appl. No.: 17/692,393

(22) Filed: Mar. 11, 2022

(65) Prior Publication Data

US 2022/0196377 A1 Jun. 23, 2022

Related U.S. Application Data

(63) Continuation of application No. PCT/EP2020/071122, filed on Jul. 27, 2020.

(30) Foreign Application Priority Data

Sep. 11, 2019 (DE) ...................... 10 2019 124 366.1

(51) Int. Cl.
*G01B 5/06* (2006.01)
*B21D 28/14* (2006.01)
(Continued)

(52) U.S. Cl.
CPC ............. *G01B 5/061* (2013.01); *B21D 28/14* (2013.01); *B21D 28/34* (2013.01); *B21D 37/20* (2013.01)

(58) Field of Classification Search
CPC ........ G01B 5/061; B21D 28/14; B21D 28/34; B21D 37/20
(Continued)

(56) References Cited

U.S. PATENT DOCUMENTS 5,136,521 A 8/1992 Van Daalen et al.
7,806,031 B1 * 10/2010 Rytz ...................... B21D 28/16
83/639.1
(Continued)

FOREIGN PATENT DOCUMENTS

CH 265574 A 12/1949
DE 102007008698 A1 8/2008
(Continued)

*Primary Examiner* — Omar Flores Sanchez
(74) *Attorney, Agent, or Firm* — Laurence A. Greenberg; Werner H. Stemer; Ralph E. Locher (57) ABSTRACT

A method and a set-up apparatus for a tool for punching or forming sheet-form materials having a punch holder into which a punch of the tool is insertable and a die holder into which a die of the tool or a die carrier holding the die is insertable. The punch holder and the die holder are movable towards one another by a guide. The punch holder is transferred along the guide into a measuring position in which the punch rests on a surface of a measurement object which rests on the die. A distance of the punch holder is measured from a zero point of the die holder and a distance of the measurement object from the zero point. An evaluation device outputs a punch length of the punch and a die height of the die or a die height of the die arranged in the die carrier.

20 Claims, 10 Drawing Sheets

(51) Int. Cl.
*B21D 28/34* (2006.01)
*B21D 37/20* (2006.01)

(58) Field of Classification Search
USPC .......................................... 83/398.91, 399.11
See application file for complete search history.

(56) References Cited

U.S. PATENT DOCUMENTS

| | | | |
|---|---|---|---|
| 10,071,455 | B2 | 9/2018 | Iwamoto |
| 2012/0060580 | A1* | 3/2012 | Buettner ................ B21D 28/00 |
| | | | 72/483 |
| 2012/0067187 | A1* | 3/2012 | Buettner .............. B21D 28/265 |
| | | | 83/522.27 |
| 2019/0344324 | A1 | 11/2019 | Kerscher et al. |
| 2020/0269303 | A1* | 8/2020 | Takahashi ............... G01L 5/167 |
| 2021/0323043 | A1* | 10/2021 | Takahashi ............... B21D 28/18 |
| 2024/0009726 | A1* | 1/2024 | Staudinger ............. B21D 28/34 |

FOREIGN PATENT DOCUMENTS

| | | |
|---|---|---|
| DE | 102017201787 A1 | 8/2018 |
| EP | 0417836 A1 | 3/1991 |
| EP | 2913116 A1 | 9/2015 |
| WO | 2018055185 A1 | 3/2018 |

\* cited by examiner

SET-UP APPARATUS AND METHOD FOR SETTING UP A TOOL FOR PUNCHING OR FORMING SHEET-FORM MATERIALS

CROSS-REFERENCE TO RELATED APPLICATION

This application is a continuation, under 35 U.S.C. § 120, of copending International Patent Application PCT/EP2020/071122, filed Jul. 27, 2020, which designated the United States; this application also claims the priority, under 35 U.S.C. § 119, of German Patent Application 10 2019 124 366.1, filed Sep. 11, 2019; the prior applications are herewith incorporated by reference in their entirety.

FIELD AND BACKGROUND OF THE INVENTION

The invention relates to a set-up apparatus for setting up a tool for punching or forming sheet-form materials, and a method for this purpose.

Tools for forming or punching comprise a punch and a die and preferably a stripper arranged in between. These punching and forming tools are used in machine tools for machining sheet-form materials, in particular metal sheets. Such tools are subject to wear on account of the machining, meaning that at least one cutting edge of the punch and/or of the die no longer has the required sharpness and this can result in a lack of precision or reduced quality of machining. It is therefore necessary to resharpen such tools. Moreover, this has the advantage that the tools can be used for a long operating lifetime.

As a result of the tools being resharpened, the length of the punch and/or the height of the die changes. It is therefore necessary to measure these tools with regard to their actual dimensions in order that they are taken into consideration by the machine tool during the effected punching, forming and cutting processes, at least with regard to the material thickness to be machined of the sheet-form material.

A set-up device in which a punch of the tool is inserted into a punch holder in order to measure a punch length is already known. Subsequently, after the punch has been removed, a die is inserted into the set-up device in order to measure a die height. Subsequently, the punch is inserted again in order to measure a depth of penetration of the punch into the die. These individual measured values are then assigned to one another and forwarded to the machine tool.

SUMMARY OF THE INVENTION

It is accordingly an object of the invention to provide a set-up apparatus and a set-up method which overcome the above-mentioned and other disadvantages of the heretofore-known devices and methods of this general type and which provide for an apparatus and a method for setting up tools for punching and forming sheet-form materials, making it possible to reduce the set-up time for the set-up operation.

With the above and other objects in view there is provided, in accordance with the invention, a set-up apparatus for a tool for punching or forming sheet-form materials, the tool having at least one punch and one die, the set-up apparatus comprising:
a punch holder into which the punch is insertable;
a die holder into which the die or a die carrier for holding the die is insertable;
at least one guide configured to enable said punch holder and said die holder to move towards one another;
said punch holder is transferable along said guide into a measuring position in which said punch rests on a surface of a measurement object and an underside of the measurement object rests on the die;
a measurement apparatus configured to measure a distance of the punch holder from a zero point of said die holder and a distance of the measurement object from the zero point of said die holder; and
an evaluation device configured to output at least a punch length of the punch and a die height of the die or a die height of the die arranged in said die carrier.

In other words, the objects of the invention are achieved by a set-up apparatus for tools for punching or forming sheet-form materials which comprise at least one punch or one die, in which the punch is insertable into a punch holder and a die into a die holder, and the punch holder is movable at least along a guide towards the die holder, wherein the punch holder is transferable along the guide into a measuring position in which the punch rests on a measurement surface of a measurement object and the measurement object rests with its underside on the die, wherein, in this measuring position, a distance of the punch holder from a zero point of the die holder and a distance of the measurement object from the zero point of the die holder is able to be measured, and an evaluation device outputs a punch length of the punch and a die height of the die or a die height of the die with a die carrier. This set-up apparatus has the advantage that, in a working step or checking step, both the length of the punch and the height of the die with or without a die carrier are able to be measured. As a result, a time reduction during setting up can be achieved.

Furthermore, the measurement object is preferably in the form of a measurement plate, preferably with a defined thickness of the measurement plate. As a result, it is easier to measure the punch length and the die height since, starting from a zero point of the die height, both the contact area of the die and the length of the punch can easily be measured. This is based, during the determination of the punch length, in particular on the fact that a main body of the punch or an adjusting ring of the punch is positioned in a defined position in the punch holder such that, as a result, a defined dimension is able to be measured for measuring the distance of the punch holder from the zero point of the die.

Furthermore, the measurement object is preferably transferable from a non-use position into the measuring position between the punch in the punch holder and the die in the die holder. This can take place manually. It is also possible for drives to be provided, using which such a movement is able to be effected. Thus, by way of a simple movement, in particular a pivoting-in movement, the measurement object or a gauge block which is not connected to the set-up apparatus can be transferred into a measuring position in order to subsequently allow the punch length and the die height to be measured by the punch holder being moved onto the die holder.

Preferably, after the punch length and the die height have been measured, the measurement object is movable into the non-use position and the punch holder is movable along the guide in the direction of the die, and a penetration of the punch into an opening in the die is able to be measured by the measurement device. As a result, a penetration check can be carried out in order to ensure that the punch is oriented with respect to the die or die opening. At the same time, the presence of a die clearance can be ascertained therefrom.

In a further advantageous configuration of the set-up apparatus, the measurement object is movable along the guide or a separate column. For example, the measurement object can be provided at a distance from the die holder and punch holder such that collision-free pivoting-in is possible between the punch and the die. Subsequently, when the punch holder is lowered onto the die, the measuring position for measuring the punch length and the die height can automatically be taken up.

Preferably, the set-up apparatus comprises a stripper holder which is provided between the die holder and the punch holder and is preferably likewise movable along the guide. A multiplicity of the tools for punching or forming comprise such strippers or hold-down devices. For measuring a necessary penetration depth of the punch into the die, the stripper should be taken into consideration, provided that the latter is inserted in the tool.

To measure the penetration depth of the punch into the die, the punch holder is preferably transferable along the guide to the measuring position for resting on the measurement object, in which position the stripper arranged in the stripper holder rests on the main body or adjusting ring of the punch and the measurement device measures the distance between the zero point of the die and the stripper holder. As a result of the difference between the distance of the stripper holder from the zero point of the die holder and the measured punch length, the penetration depth of the punch can be measured. The penetration depth is the free length of the punch that can penetrate into the opening of the die both when a stripper is present and when one is not present. This penetration depth of the punch needs to be taken into consideration in punching tools, since the required penetration depth for machining a sheet-form material ought to comprise at least the thickness of the sheet-form material and penetration of the punch into the opening in the die.

Furthermore, provision is preferably made that the measurement device generates a tool-specific dataset for the machine tool from the measured data. This dataset is forwarded to the machine tool such that the actual dimensions of the machining tool are taken into consideration for the subsequent machining of a sheet-form material. The dataset can also be forwarded to a database or a cloud. The machine tool and/or the controller may have access thereto.

Advantageously, the punch holder is movable counter to a restoring element into the measuring position and preferably automatically returnable into the starting position by the restoring element. This allows easy operation.

Advantageously, when a stripper element is present, a restoring element is likewise provided, counter to which the stripper holder is movable into the measuring position and preferably returnable automatically into the starting position again by the restoring element. Alternatively, at least the starting position and the measurement station of the punch holder and/or the stripper can be controlled by a drive.

The set-up apparatus preferably has a base frame in which the die holder is provided and on which the at least one guide for the punch holder and preferably the stripper holder is arranged.

The punch holder and/or the stripper holder and/or the die holder each preferably have, facing the front face of the base frame, an insertion opening which has at least one releasable connecting element for fixing the punch and/or the stripper and/or the die in the respective holder. As a result, the punch and/or the stripper and/or the die can easily be positioned manually in the respective holder. It is also possible for process-assisted insertion of the punch and/or the stripper and/or the die jointly by an auxiliary tool to take place.

The punch holder and optionally the stripper element are preferably transferable into a changing position with respect to the die holder and are preferably lockable in this changing position by a lever arrangement or by an actuable lock. The actuable lock may be electrically, pneumatically, hydraulically or magnetically actuable. This makes it possible for the tool to subsequently be able to be removed easily from the set-up apparatus, for example by way of a cassette which also retains the tool in the machine tool in a magazine.

Preferably provided on the base frame of the set-up apparatus is a drawer for holding a cassette for the tool, said cassette holding the punch, preferably the stripper, and the die or the die with the die carrier. In preparation for the removal of the entire tool from the set-up apparatus after measurement, the cassette can be inserted into the drawer in order subsequently to allow the tool to be removed by closing and re-opening the drawer.

The cassette for holding the tool preferably has gripping elements for the punch and preferably the stripper and the die, the gripping force of which, after gripping the punch and preferably the stripper and the die, is greater than a retaining force of the releasable connecting elements in the insertion opening of the punch holder, preferably the stripper holder and the die holder. As a result, easy releasing of the tool when withdrawing the cassette from the holders can be allowed.

Preferably, a calibration standard for the set-up apparatus is provided, by way of which a defined distance from the zero point of the die holder to the punch holder and preferably from the zero point of the die holder to the stripper holder is settable. This calibration standard is insertable into the die holder. Subsequently, the punch holder and preferably the stripper holder can be positioned on the calibration standard in order to subsequently carry out calibration of the measurement device with regard to the respective distances.

The set-up apparatus preferably has on the base frame a cassette holder with an unlocking element. This allows the cassette, which holds the punch, preferably the stripper element and the die, to be positionable in the cassette holder. Subsequently, using the unlocking element, the cassette can be opened, in particular the gripping elements can be opened or unlocked, such that the punch, preferably the stripper and the die, can be removed easily from the cassette in order to insert them into the punch holder, preferably into the stripper holder and into the die holder.

The object on which the invention is based is also achieved by a method for setting up a tool for punching or forming a sheet-form material with a set-up apparatus which comprises at least one punch holder and one die holder and at least one guide, using which the punch holder is able to be moved towards the die holder, in which the punch is inserted into the punch holder and the die is inserted into the die holder and the punch holder is moved along the guide towards the die holder in order to transfer the punch holder into a measuring position in which the punch rests on a measurement surface of a measurement object which is positioned with its underside on the die, and a measurement apparatus is used to measure a distance of the punch holder from a zero point of the die holder and a distance of the measurement object from the zero point of the die holder. A length of the punch and a height of the die are subsequently output by an evaluation device. The die height can be encompassed by a die without a die carrier and a die with a die carrier and preferably spacer elements arranged in between. As a result of the punch holder being moved, or fed in, towards the die at the measurement point, both the length of the punch and the height of the die can be measured simultaneously. This may allow a reduction in the set-up time.

In an advantageous configuration of the method, before the punch holder is transferred into the measuring position, the measurement object is transferred from a non-use position into the measuring position between the punch in the punch holder and the die in the die holder. As a result, improved readiness of the set-up apparatus for measuring the punch length and the die height can be achieved.

After the punch length and the die height have been measured, the measurement object is moved into the non-use position and the punch holder is moved along the guide towards the die such that the measurement device measures a penetration of the punch into the opening in the die. As a result, a penetration check can take place in order to ensure that the die and the punch also fit together or are aligned with one another and jointly form the tool.

In an advantageous configuration of the method, the set-up apparatus comprises a stripper holder into which a stripper is inserted and the punch holder with the inserted punch is moved along the guide to the measuring position, wherein, during the movement, the stripper rests on the main body or adjusting element of the punch and the stripper holder is moved along the guide by the punch holder. The measurement device can subsequently measure a distance between the zero point of the die and the stripper holder and a distance between the zero point of the die and the punch holder. The thickness of the measurement object which rests on the die is stored in the measurement device. Subsequently, the length of the punch, the die height and also the penetration depth of the punch, in the case of a tool with a stripper, into the die can be measured.

Furthermore, the values of the tool in the set-up apparatus that are measured by the measurement device preferably form a tool-specific dataset, which is forwarded to the database, a cloud or to the machine tool. This can take place wirelessly or by wire. Thus, the machine tool can use the exact measured geometric data of the tool to effect the working steps.

Furthermore, preferably after the measurement of the tool has been carried out, the punch holder and preferably the stripper holder are moved into a changing position with respect to the die holder and locked. The die holder is preferably provided fixedly in the set-up apparatus, in particular in the base frame of the set-up apparatus. This changing position can be taken up for example by a locking mechanism. For example, a pivot lever or lever arrangement can lock the punch holder that has been moved along the guide, and preferably the stripper holder, in the changing position.

Preferably, a drawer for holding a cassette is provided in the base frame, which is opened to remove the tool, in order to insert the cassette, such that, subsequently, as a result of the drawer being closed, the cassette engages with the tool. This has the advantage that the cassette which takes and holds the tool, is removed together with the tool as a unit after the drawer has been opened, and can be inserted directly into a magazine of the machine tool.

Other features which are considered as characteristic for the invention are set forth in the appended claims.

The invention and further advantageous embodiments and developments thereof will be described and explained in more detail below on the basis of the examples illustrated in the drawings. The features that can be gathered from the description and the drawings can be used individually by themselves or as a plurality in any combination according to the invention.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
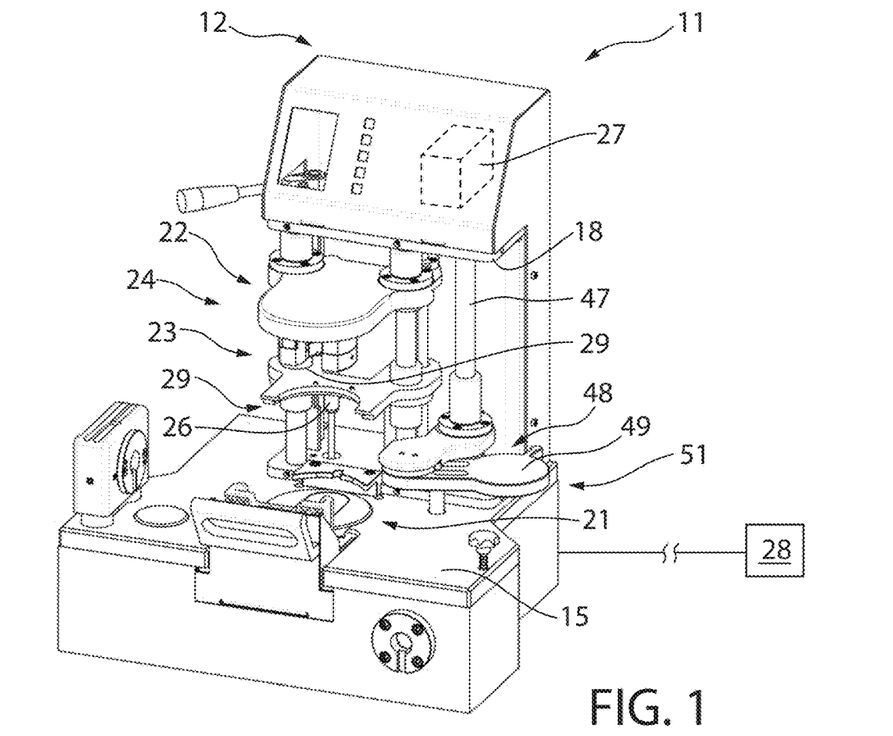
FIG. 1 shows a perspective view of the set-up apparatus.
Figure 2:
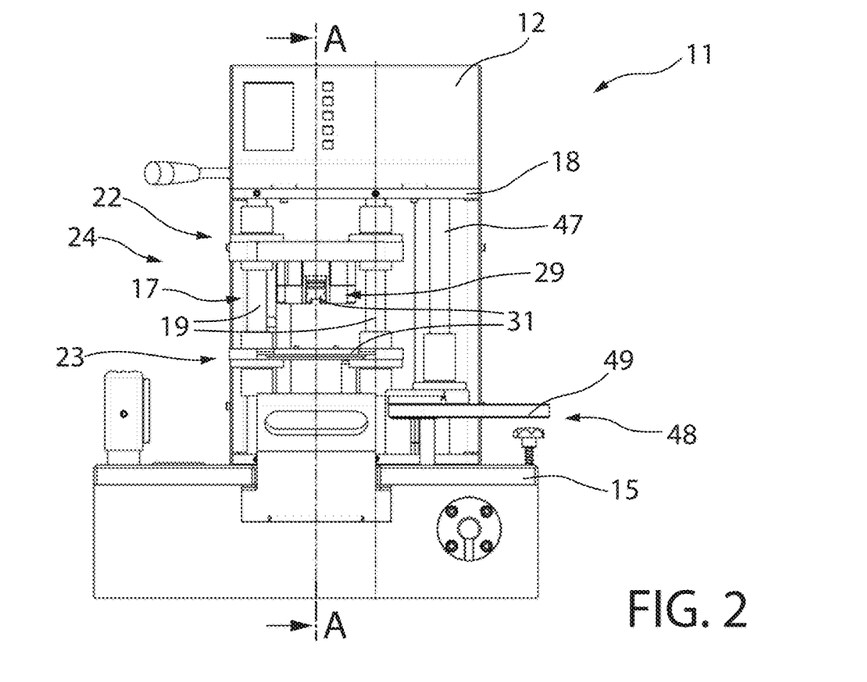
FIG. 2 shows a schematic front view of the set-up apparatus.
Figure 3:
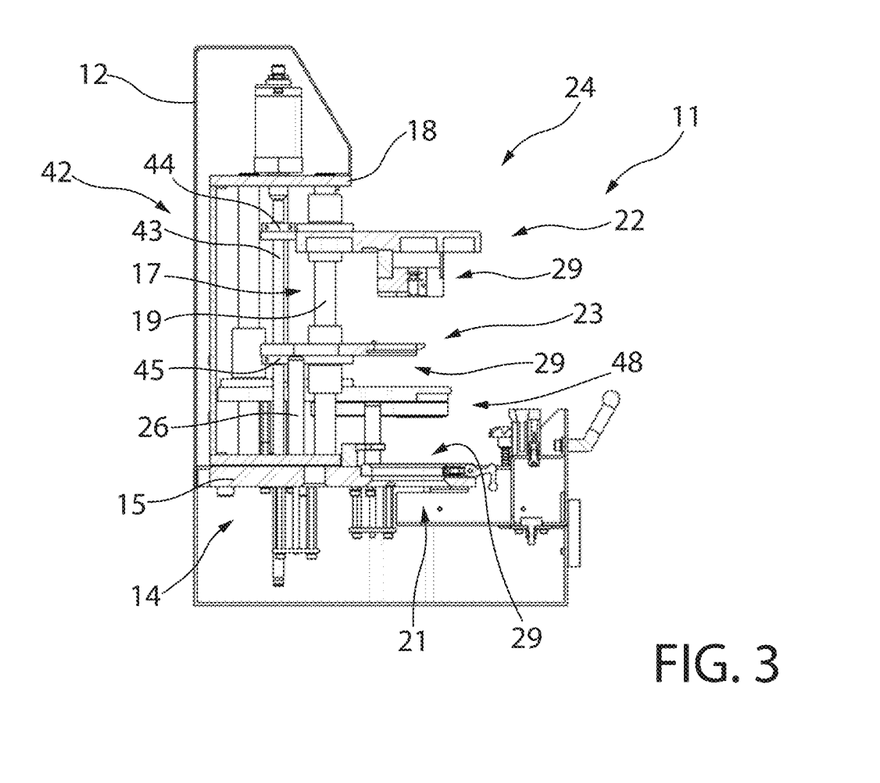
FIG. 3 shows a schematic sectional view of the set-up apparatus along the line A-A in FIG. 2.

Referring now to the figures of the drawing in detail, FIG. 1 shows a perspective front view of a set-up apparatus 11 for tools 35 (FIG. 4) for forming or punching sheet-form materials. FIG. 2 shows a schematic front view and FIG. 3 shows a schematic sectional view of the set-up apparatus 11 along the line A-A in FIG. 2. The set-up apparatus 11 comprises a housing 12. Provided in the housing 12 is a base frame 14. This base frame 14 comprises a base plate 15, from which a guide 17 extends vertically upwards. Provided at a distance from the base plate 15 is an upper cover plate 18 of the base frame 14, for fixing the guide 17. The guide 17 comprises preferably two guide columns 19 that are spaced apart parallel to one another.

Provided on or in the base frame 14, in particular the base plate 15, is a die holder 21. This die holder 21 is arranged fixedly on the base frame 14. Provided above the die holder 21 is a punch holder 22. This punch holder 22 is held on the guide 17 and movable along the guide columns 19. Preferably, a stripper holder 23 is provided between the punch holder 22 and the die holder 21. This stripper holder 23 is guided on the guide 17 and movable up and down along the guide columns 19.

The punch holder 22 and the stripper holder 23 are provided in a starting position 24 or home position. A restoring element 26 acts on the punch holder 22, said restoring element 26 retaining the punch holder 22 in the starting position 24.

Preferably, a restoring element 26 is likewise provided on the stripper element 23 in order to position it in the starting position 24. The punch holder 22 and the stripper element 23 are displaceable and movable towards the die holder 21 counter to the restoring force of the restoring element 26.

Figure 4:
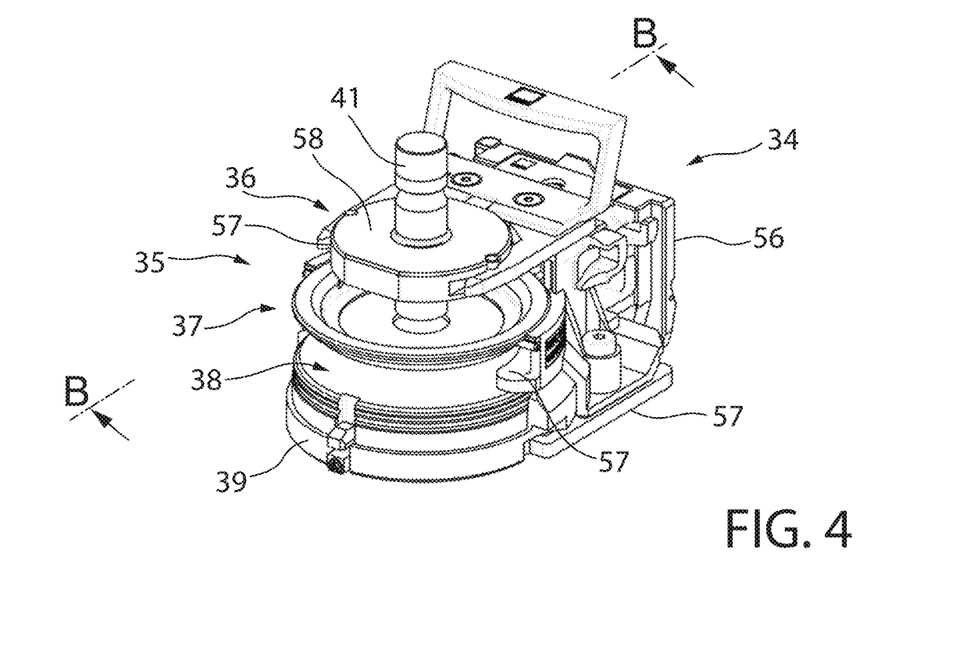
FIG. 4 shows a perspective view of a cassette with a punching tool retained therein.
Figure 5:
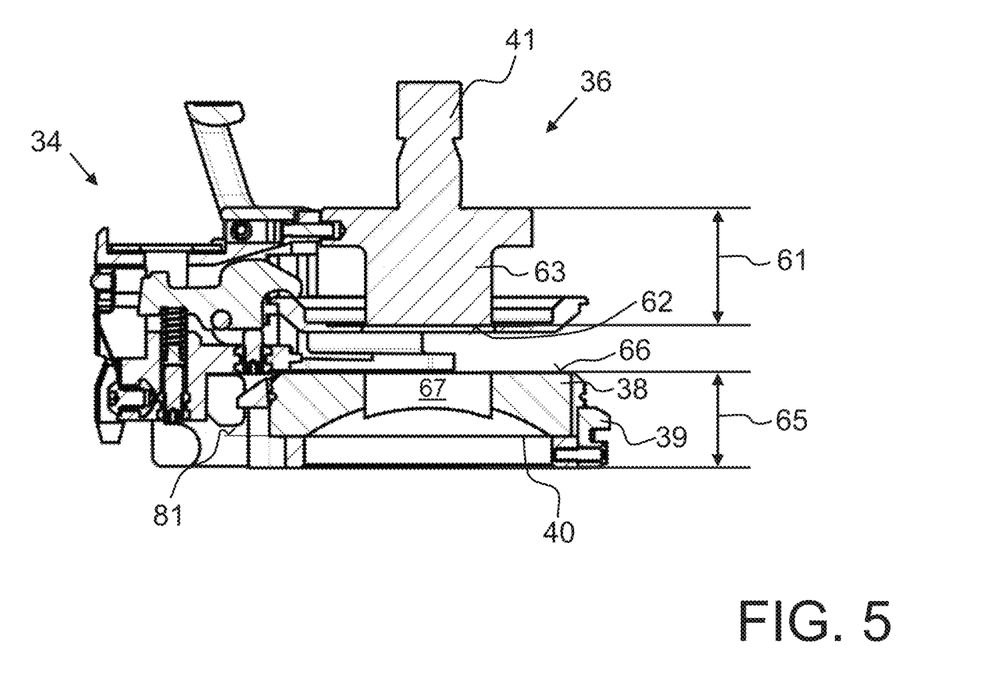
FIG. 5 shows a schematic sectional view of the cassette with a punching tool along the line B-B in FIG. 4.

The punch holder 22 comprises a plug-in opening 29 for receiving a punch 36 of a tool 35, which is illustrated in FIGS. 4 and 5. Preferably assigned to the plug-in opening 29 is a releasable connecting element 31 such that, after the punch 35 has been inserted, in particular the clamping pin 41 thereof, the punch 36 is securely held.

The stripper holder 23 comprises a plug-in opening 29 into which a stripper 37 of the tool 35 according to FIGS. 4 and 5 is insertable. This plug-in opening 29 of the stripper holder 23 likewise has a releasable connecting element 31 in order to secure the stripper 37 after it has been inserted into the stripper holder 23.

The die holder 21 likewise comprises a plug-in opening 29 in order to insert a die 38 of the tool 35 according to FIGS. 4 and 5. By means of at least one releasable connecting element 31, the die 38 is securely held in the die holder 21. Into the die holder 21 it is possible to insert both a die 38 with a die carrier 39, which is illustrated in FIGS. 4 and 5, and a die 38 without a die carrier. Spacer elements 40 can be provided between the die carrier 39 and the die 38.

The punch holder 22 and the stripper holder 23 preferably engage with both guide columns 19 and are movable along these. Provided parallel to these guide columns 19 is a sensor bar 43 of a measurement device 42, along which a sensor 44 of the punch holder 22, a sensor 45 of the stripper holder 23 is movably guided.

Provided parallel to the guide 17 is a further column 47 to which a measurement object 48 is fastened. This measurement object 48 can be movable up and down along the guide column 47 or kept at a particular height. The measurement object 48 has for example a pivotable measurement plate 49 which is pivotable horizontally—preferably parallel to the base plate 15. This measurement object 48 can also be pivotable from a non-use position 51 according to FIG. 1 into a measuring position 78, which is described in more detail below with reference to FIG. 7.

The movement of the punch holder 22 and/or of the stripper holder 23 towards the die holder 21 can be effected manually. It is also possible for a motor drive to be provided, by way of which the infeed movement is generated.

The set-up apparatus 11 comprises an evaluation device 27 for the measured data from a measurement apparatus 42. The evaluation device is connected wirelessly or by wire to a machine tool 28 in order to transmit the measured data of the tool 35 to the machine tool or a cloud or a database. This dataset can be retrieved or downloaded from the cloud or the database at a later time.

FIG. 4 illustrates a perspective view of a cassette 34, which holds a tool 35. FIG. 5 shows a schematic sectional view of the cassette 34 with the tool 35 according to FIG. 4. Such a cassette 34 is positioned interchangeably for example in a magazine of a machine tool 28 by means of a cassette guide 56. This machine tool 28 may be a punching and/or bending machine tool or a laser-cutting punching and/or bending machine tool. This cassette 34 holds the punch 36 via gripping elements 57. The gripping elements 57 engage preferably with a main body 58 of the punch 36 or with an adjusting ring of the punch 36. The stripper 37 is held in the cassette 34 at a distance from the punch 36. It is likewise held by gripping elements 57. At a distance from the stripper 37, the die 38 is retained in the cassette 34 by gripping elements 57. In the exemplary embodiment, the die 38 is provided in a die carrier 39. Spacer discs 40 are provided between the die carrier 39 and the die 38.

The set-up apparatus 11 serves to measure geometric data of the tool 35. A measurement variable is a punch length 61 (FIG. 5), which is defined for example by an upper edge of the main body 58 of the punch 36 as far as a front face 62 of the punch 36 or of the machining tool 63.

A further measurement variable is the die height 65 (FIG. 5). The die height 65 is determined from an underside of the die 38 [0068] or of the die carrier 39 as far as a contact face 66 of the die 38, which surrounds an opening 67. Since the contact face 66 of the dies 38 is subject to wear, to set a defined die height 65 between the die 38 and the die carrier 39, a spacer disc 40 may be provided.

A further measurement variable is the penetration depth. The penetration depth is the distance between an underside of the stripper 37 and the end face 62, protruding with respect thereto, of the machining tool 63 of the punch 36, and is described with reference to FIG. 11.

Figure 6:
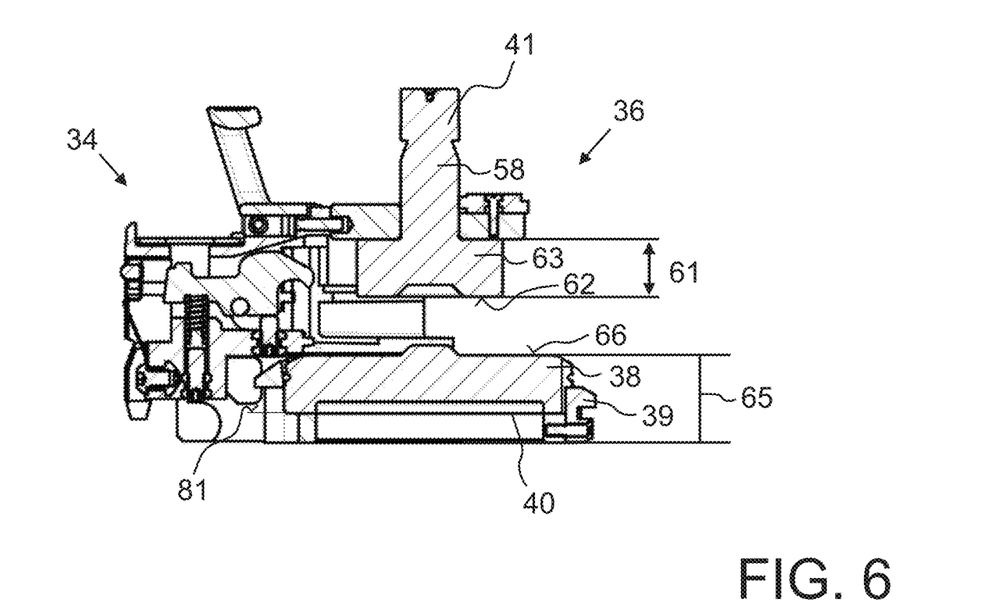
FIG. 6 shows a schematic sectional view of the cassette with a forming tool.

FIG. 6 illustrates a schematic sectional view of the cassette 34 with the tool 35 in the form of a forming tool. Using such a forming tool, it is possible to introduce for example a bowl-shaped recess into a sheet-form material. This forming tool is only by way of example. In this forming tool, a measurement variable is the punch length 61, which is defined for example by an upper edge of the main body 58 of the punch 36 as far as the front face 62 of the punch 36.

A further measurement variable is the die height 65 according to FIG. 6. This is determined from an underside of the die 38 or of the die carrier 39 as far as the contact face 66 of the die.

Figures 7, 8:
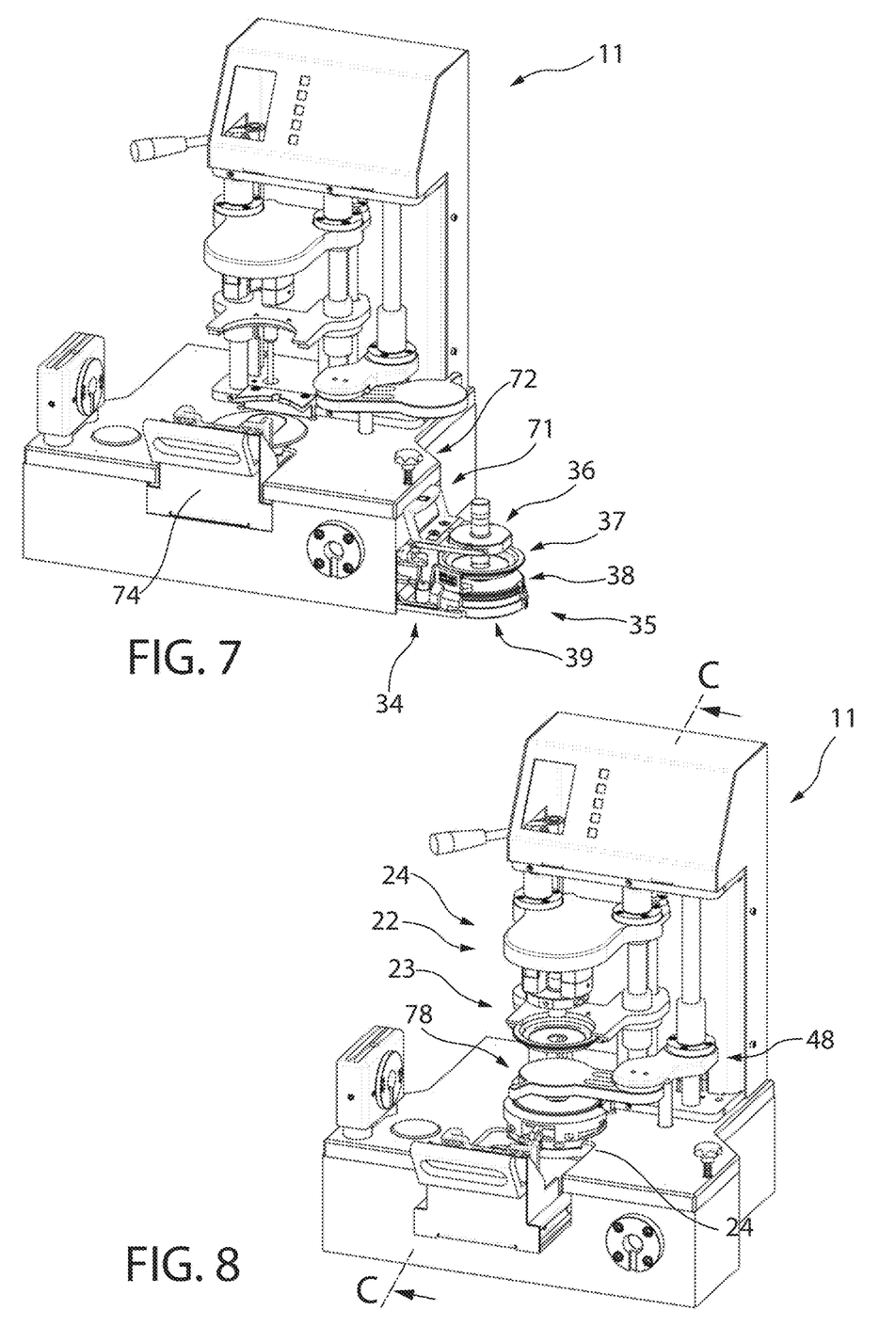
FIG. 7 shows a perspective view of the set-up apparatus in FIG. 1 in a first set-up step.
FIG. 8 shows a perspective view of the set-up apparatus with the tool positioned therein.

The measurement of these measurement variables for the tool 35 is described in the following text:

Provided on the housing 12 of the set-up apparatus 11 is a cassette holder 71. This cassette holder 71 is assigned an unlocking element 72. The cassette 34 equipped with the tool 35 is inserted into the cassette holder 71. By actuating the unlocking element 72, the retaining force of the gripping elements 57 of the cassette 34 can be released. Subsequently, the punch 36 and the stripper 37 are removed from the cassette 34. The punch 36 is inserted into the punch holder 22 and the stripper 37 is inserted into the stripper holder 61. To insert the die 38 into the die holder 21, a drawer 74 on the housing 12 can preferably be opened (FIG. 7). Subsequently, the die 38, preferably with the cassette 34, can be inserted more easily. The punch 36, the stripper 37 and the die 38 can also be removed manually from the cassette.

FIG. 8 shows the set-up apparatus 11 in a starting position 24 for measuring the measurement variables. The punch 36, the stripper 37 and the die 38 have been inserted into the respective holders 21, 22, 23. The measurement object 48, in particular the measurement plate 49, has been pivoted into the measuring position 52. This starting position 24 for measuring the measurement variables is illustrated in a sectional view according to FIG. 8. It is apparent from this sectional view that the punch 36 inserted in the punch holder 22 is arranged at a distance from the stripper 37 in the stripper holder 23. In turn, a distance is provided between the stripper 37 and the measurement object 48. The measurement object 48 is arranged in a raised manner or in a manner spaced apart from the die 38 in the die holder 21.

Figure 10:
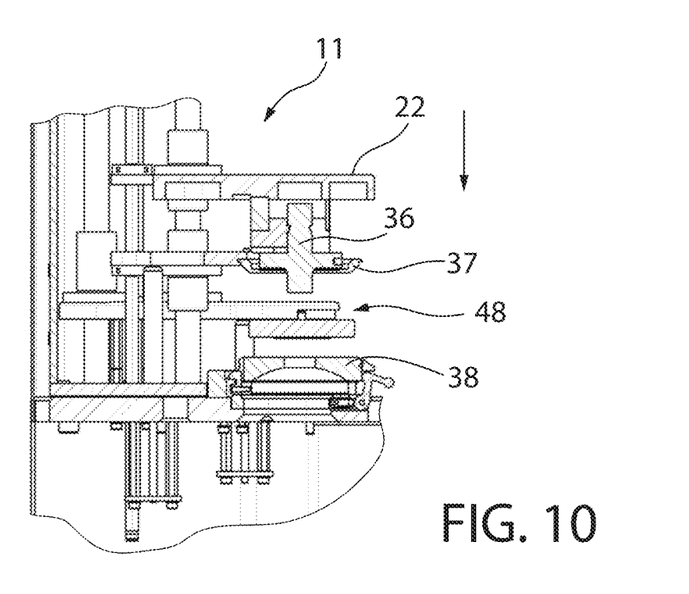
FIGS. 10 to 12 show schematic sectional views during the transfer of the tool into a measuring position.
Figure 11:
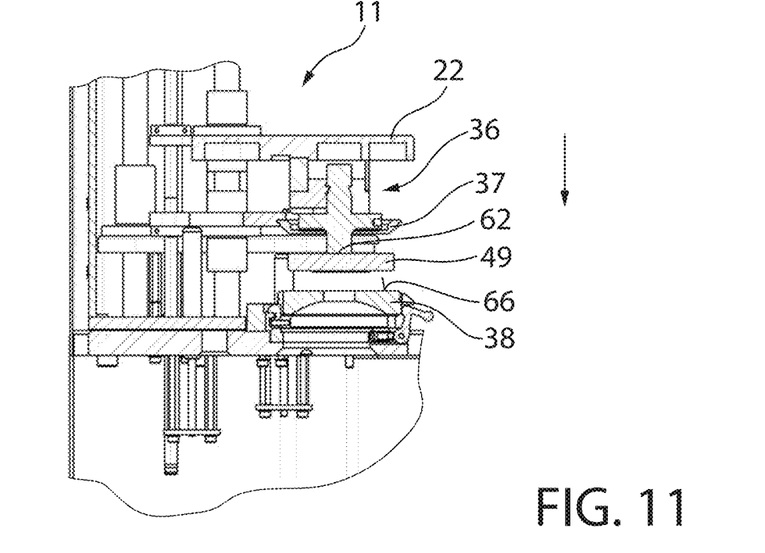
Figure 12:
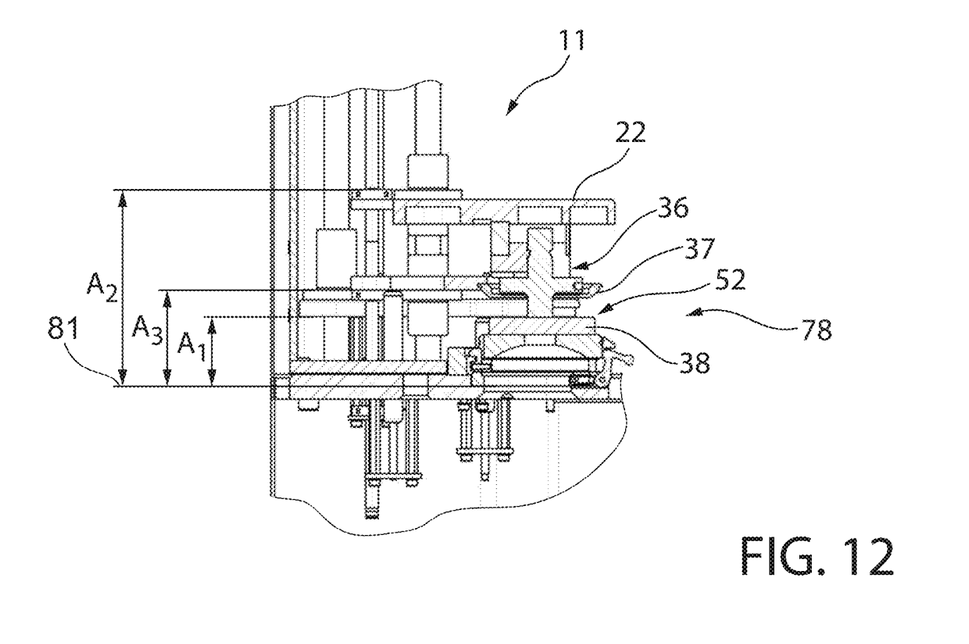

Starting from this starting position 24 of the set-up apparatus 11, individual steps are illustrated below in FIGS. 10 to 12, leading to the adoption of a measuring position 52 for determining the punch length 61, the die height 65 and the penetration depth 69.

The punch holder 22 is lowered until the main body 58 of the punch 36 rests on the stripper 37.

Subsequently, the punch holder 22 is moved further down together with the stripper element 23 until the front face 62 of the punch 36 rests on the measurement plate 49. This is illustrated in FIG. 11.

There then takes place a further movement, in which the punch holder 22, the stripper holder 23 and the measurement object 48 are moved together with a respective defined distance from one another until the measurement object 48 rests on the contact face 66 of the die 38. This is illustrated in FIG. 12. This position is the measuring position 52.

The die 38 rests in the die holder 21. This contact face forms a zero point 81 for the measurement device 42. The measurement object 48 rests on the die 38. By means of a sensor 46 provided on the measurement object 48, the distance A1 is measured by the sensor bar 43. The measurement plate 48, or the distance of the underside of the measurement object 48 from the sensor 46, is known and defined. Therefore, the die height 65 can be determined from this measured distance A1.

Furthermore, the distance A2 between the zero point 81 and the sensor 44 of the punch holder 22 is measured. Since a distance of the sensor 44 from the underside of the punch holder 22 or the plug-in opening 29 is defined, the punch length 61 of the punch 36 can be determined from the difference between the distances A2 and A1.

In addition, the distance from the zero point 81 is measured by the sensor 45 of the stripper holder 23. The difference between the distances A3 and A1 yields the penetration depth of the machining tool 63 of the punch 36.

Figure 9:
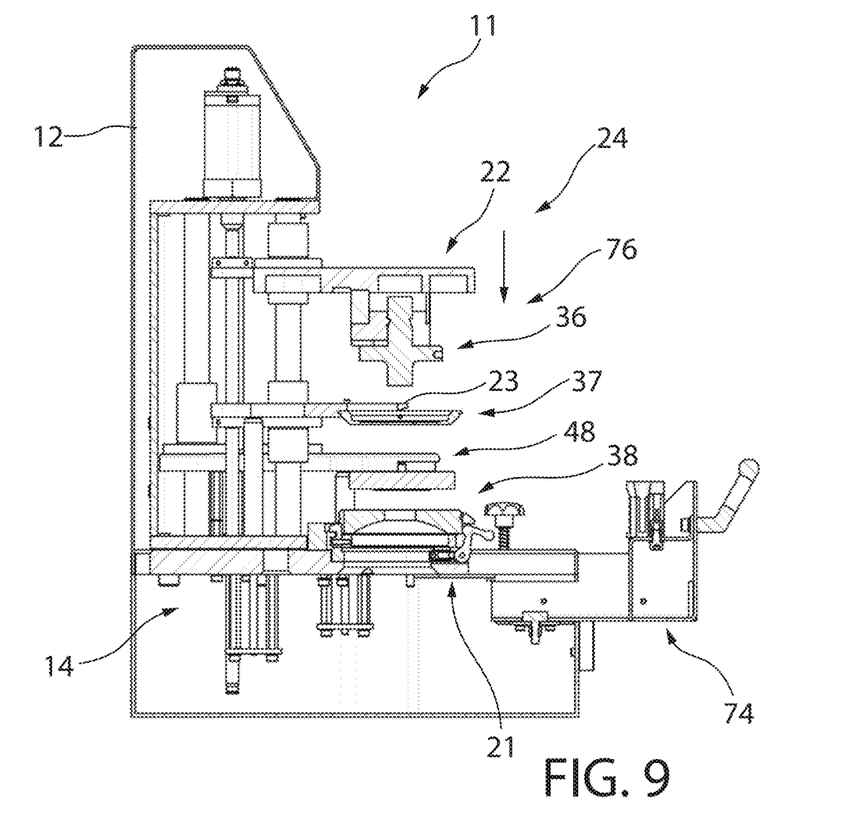
FIG. 9 shows a schematic sectional view of the set-up apparatus along the line C-C in FIG. 8.
Figure 13:
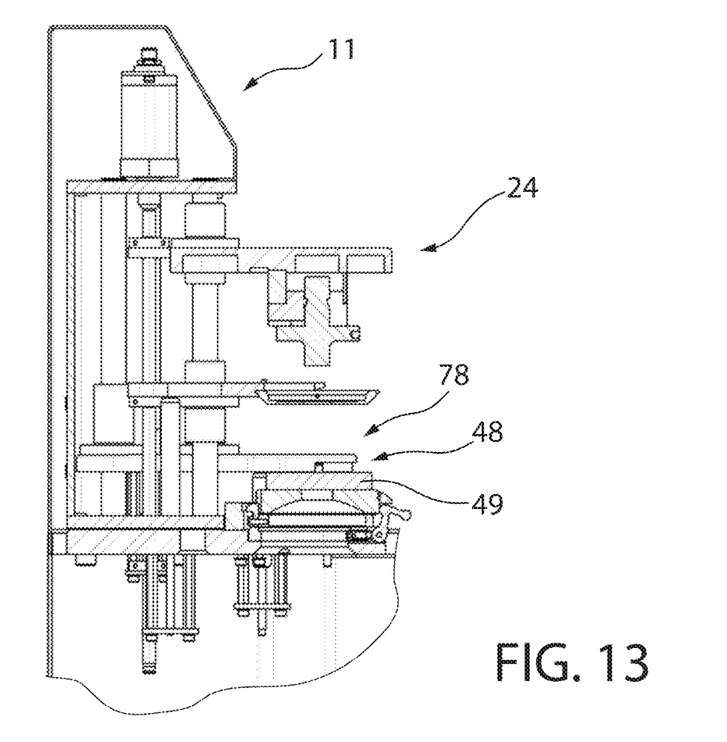
FIG. 13 shows a schematic view of an alternative embodiment in relation to FIG. 11.

FIG. 13 illustrates an alternative regarding a starting position of the measurement object 48 in relation to FIG. 9. In this alternative embodiment, the measurement plate 49 is already resting on the contact face 66 of the die 38. The movement of the punch holder 22 and of the stripper holder 23 takes place in the same way as is described in relation to FIGS. 9 to 11, however.

Figure 14:
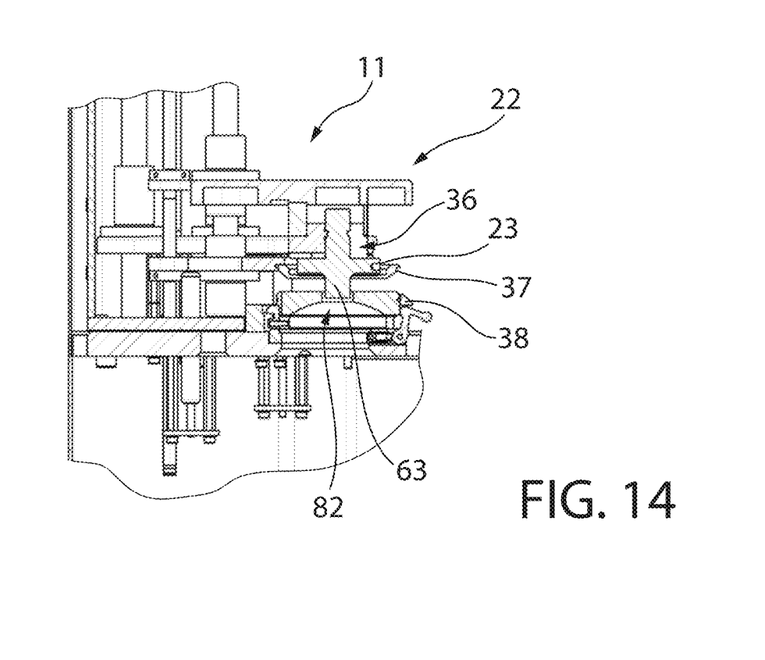
FIG. 14 shows a schematic sectional view of a further checking position of the tool in the set-up apparatus.

FIG. 14 illustrates a further arrangement of the punch holder 22 and stripper holder 23 with respect to the die 38. Starting from the measuring position 52 according to FIG. 12, the measurement object 48 can be pivoted into the non-use position 51. Subsequently, the punch holder 22 and the stripper holder 23 are moved further towards the die 38. The machining tool 63 of the punch 36 penetrates into the opening 67 in the die 38. This penetration position 82 can furthermore be detected via the sensors 44 and 45. As a result, a penetration check takes place, meaning that the assignment of the punch 36 to the die 38 is proper and a collision during the use of the machine tool is prevented whenever the machining tool 63 penetrates into the opening 67 in the die 38.

Figures 15, 16:
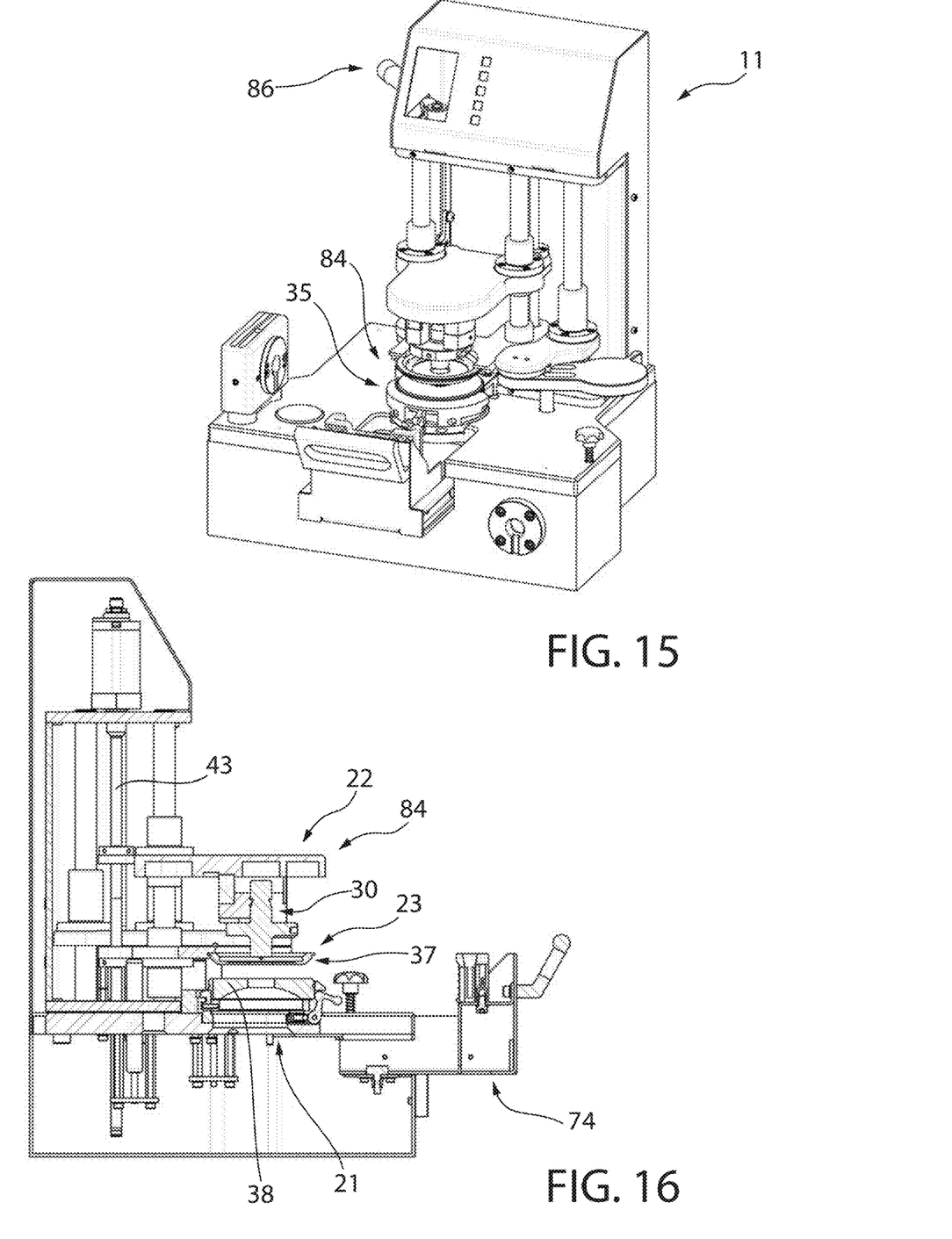
FIG. 15 shows a perspective view of the set-up apparatus in a changing position.
FIG. 16 shows a schematic sectional view of the set-up apparatus according to FIG. 15.

FIG. 15 illustrates the set-up apparatus 11 in a changing position 84. Starting from the position according to FIG. 14, the punch holder 22 and the stripper holder 23 can be moved into a starting position 24 according to FIG. 1 and subsequently into the changing position 84 by way of a downward movement. Alternatively, starting from the penetration position 82 according to FIG. 14, a downward movement of the punch holder 22 and of the stripper holder 23 can be effected by the restoring elements 26 as far as an already set locking mechanism, by way of which the changing position 84 has been adopted. Preferably, the locking mechanism comprises a lever arrangement 86 which takes up a rear position according to FIG. 14 by way of a pivoting movement, in order to limit the downward movement of the punch holder 22 and of the stripper holder 23. This changing position 84 is illustrated in more detail in a sectional view in FIG. 16. The spacing of the punch holder 22, of the stripper holder 23 and of the die holder 21 corresponds to the distance of the gripping elements 57 in the cassette from the holder thereof.

Figure 17:
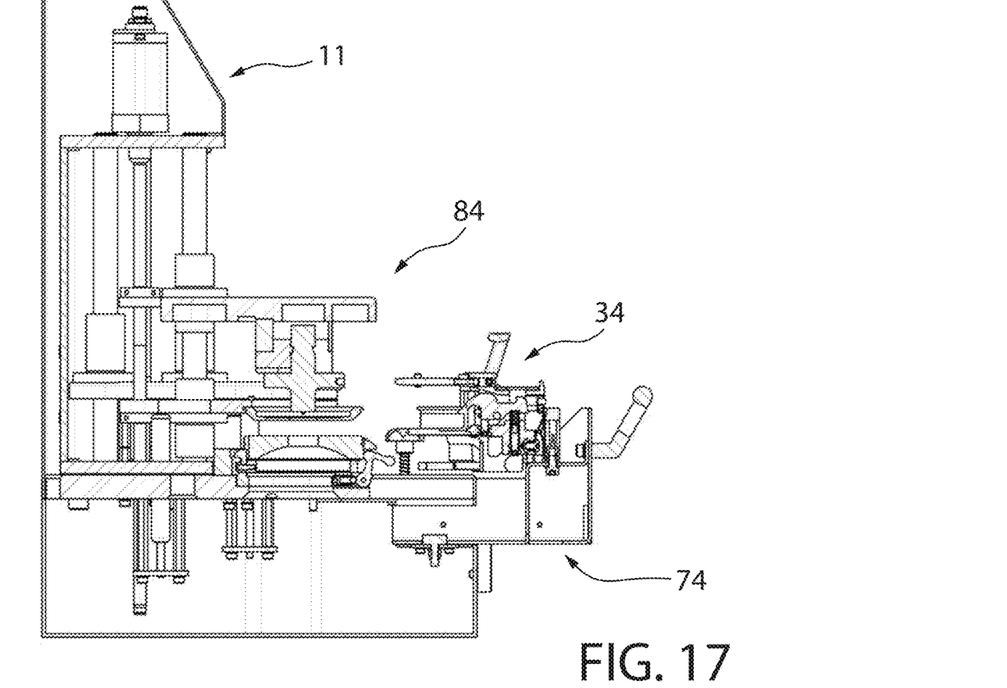
FIG. 17 shows a schematic sectional view with a cassette inserted into the set-up apparatus.
Figure 18:
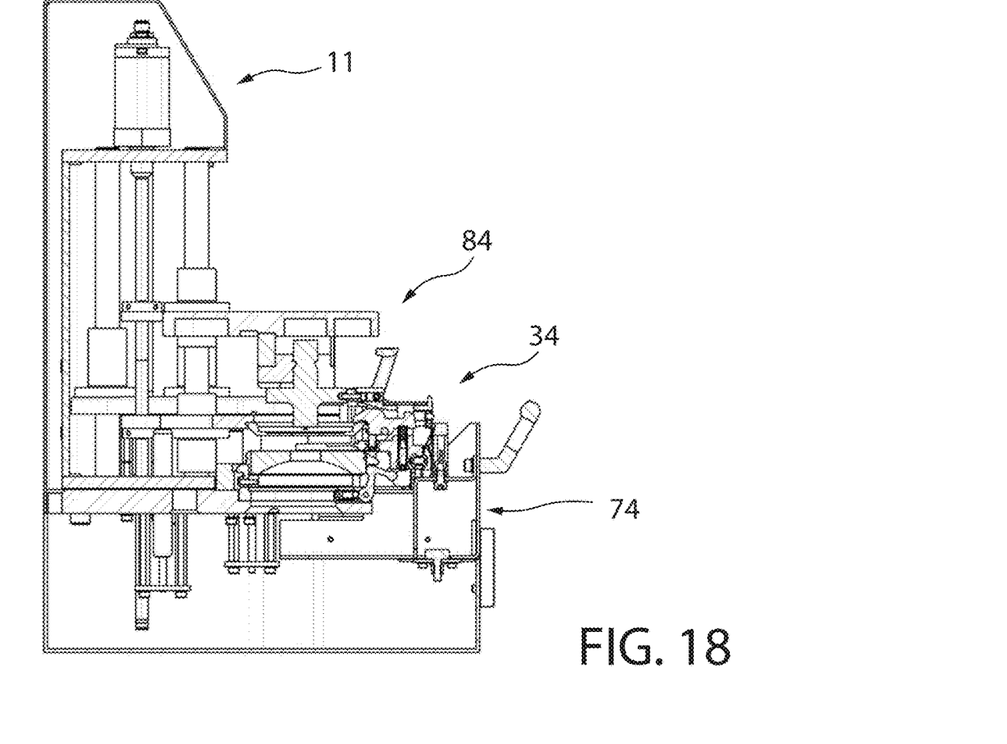
FIG. 18 shows a schematic sectional view in relation to the holding of the tool by the cassette in the changing position of the set-up apparatus.

To remove the tool 35 from the set-up apparatus 11, first of all the drawer 74 is opened. Subsequently, the empty cassette 34 is inserted into the drawer 74. This is illustrated in FIG. 17. To remove the tool 35, the drawer 74 is closed. The gripping elements 57 engage with the punch 36, with the stripper 37 and the die 38 or the die carrier 39. The gripping force of the gripping elements 57 is greater than the retaining force of the releasable connecting elements 31 in the holders 21, 22, 23. Subsequently, the drawer 74 is opened again and the cassette 34 with the gripped tool 35 removed. The cassette 34 is operational and can be transferred into the magazine of the machine tool.

Figures 19, 20, 21:
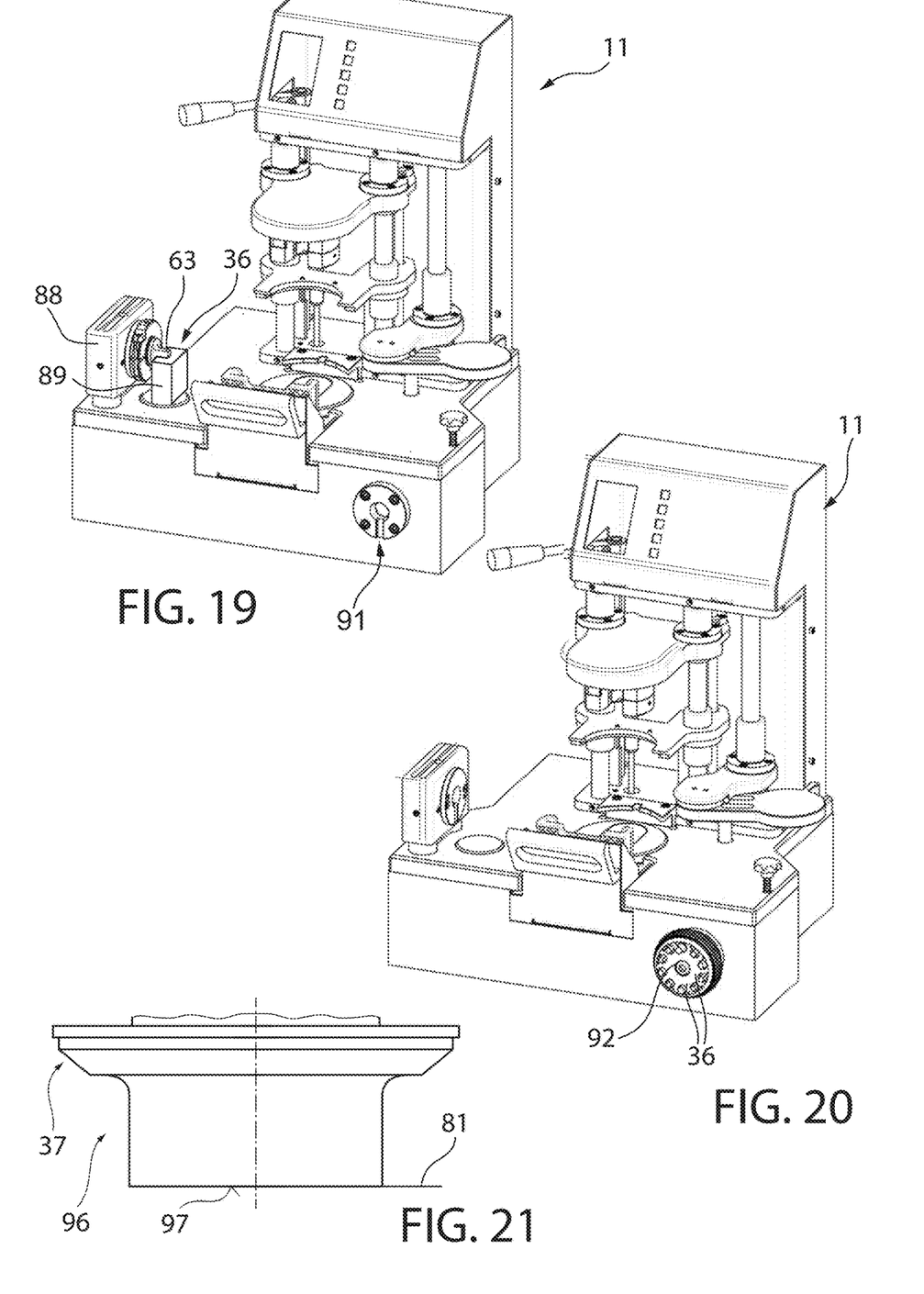
FIG. 19 shows a perspective view of the set-up apparatus in relation to the adjustment of the punch.
FIG. 20 shows a perspective view of the set-up apparatus with a multiple tool that is insertable on the base frame.
FIG. 21 shows a schematic side view of a calibration standard.

FIG. 19 illustrates a perspective view of the set-up apparatus 11 according to FIG. 1, in which the adjustment of a machining tool 63 with respect to an adjusting ring of the punch 36 is taking place. Provided on the housing 12, in particular on the base plate 15, is a retaining apparatus 88, in which a clamping pin 41 of the punch 36 can be fixed. The machining tool 63 is oriented by means of an orienting aid 89 and can subsequently be retained in a stationary manner on the punch 36 by the adjusting ring. Subsequently, the oriented punch 36 can be inserted into the punch holder 22.

Provided on a front face of the housing 12 of the set-up apparatus is a further retaining apparatus 91 (FIG. 19) for a special tool with a central fastening screw, in particular a multiple punch 93. FIG. 20 shows the set-up apparatus 11 with the multiple punch 39 inserted in the retaining apparatus 91. This is what is known as a multitool. This retaining apparatus 91 makes it possible for this multiple punch 36 to be disassembled easily. This takes place for example by releasing a fastening element 92 arranged on the end face, in order subsequently to remove the individual punches 36.

FIG. 21 illustrates a schematic side view of a calibration standard 96 for the set-up apparatus 11. Using this calibration standard 96, the measurement apparatus 42 can be calibrated before a tool 35 is measured for the first time. The calibration standard 96 is inserted into the die holder 21. A lower contact face 97 of the calibration standard 96 rests on the contact face 66 of the die holder 21—i.e. at the zero point 81. At a distance from the contact face 66, a stripper 37 is formed preferably in one piece. Formed on a top side of the calibration standard 96 is a further contact face 97, which simulates a top side of the main body of the punch 36. The individual faces of the calibration standard 96 are oriented at an exact spacing with respect to one another, such that, subsequently, the individual sensors 44, 45 and 46 of the measurement apparatus 42 can be calibrated.

The invention claimed is:

1. A set-up apparatus for a tool for punching or forming sheet-form materials, the tool having at least one punch and one die, the set-up apparatus comprising:
   a punch holder into which the punch is insertable;
   a die holder into which the die or a die carrier for holding the die is insertable;
   at least one guide configured to enable said punch holder and said die holder to move towards one another;
   said punch holder is transferable along said guide into a measuring position in which said punch rests on a surface of a measurement object and an underside of the measurement object rests on the die;
   a measurement apparatus configured to measure a distance of the punch holder from a zero point of said die holder and a distance of the measurement object from the zero point of said die holder; and
   an evaluation device configured to output at least a punch length of the punch and a die height of the die or a die height of the die arranged in said die carrier.

2. The set-up apparatus according to claim 1, wherein said measurement object is a measurement plate having a defined thickness of the measurement plate.

3. The set-up apparatus according to claim 1, wherein said measurement object is transferable from a non-use position into the measuring position between said punch holder and said die holder.

4. The set-up apparatus according to claim 1, wherein, after the punch length and the die height have been measured, said measurement object is transferable into a non-use position and said punch holder is movable along said guide in a direction of said die and said measurement device measures a penetration of the punch into an opening in the die.

5. The set-up apparatus according to claim 1, wherein said measurement object is movable along said guide or a separate column.

6. The set-up apparatus according to claim 1, which comprises a stripper holder disposed between said punch holder and said die holder, said stripper holder being movable along said guide.

7. The set-up apparatus according to claim 6, wherein said punch holder is transferable along said guide into the measuring position, in which a stripper arranged in said stripper holder rests on a main body of the punch and said measurement device measures the distance between the zero point of said die holder and said stripper holder.

8. The set-up apparatus according to claim 1, wherein a tool-specific dataset generated in the measurement device from the measured values is configured to be sent to a cloud, a database, or a machine tool.

9. The set-up apparatus according to claim 1, which comprises a base frame holding said die holder and at least said guide for said punch holder.

10. The set-up apparatus according to claim 9, wherein said punch holder and a stripper holder are movable into a changing position and configured to be locked in the changing position by a lever arrangement or a lock that is actuatable by a drive.

11. The set-up apparatus according to claim 9, which comprises a drawer for holding a cassette disposed on said base frame, said cassette holding the punch, optionally a stripper, and the die or said die carrier with the die held therein, and enabling a simultaneous removal of the punch, optionally of the stripper, and of the die.

12. The set-up apparatus according to claim 11, wherein said cassette for retaining at least one of the punch or the stripper or the die has gripping elements having a gripping force greater than a retaining force of said releasable connecting elements in a plug-in opening of said punch holder, the stripper holder, and said die holder.

13. The set-up apparatus according to claim 1, wherein a defined distance from the zero point of said die holder to said punch holder and to a stripper holder is set according to a calibration standard.

14. A method for setting up a tool for punching or forming a sheet-form material, the tool having at least one punch and a die, the method comprising:
    providing a set-up apparatus with at least one punch holder and one die holder and at least one guide, wherein the at least one punch holder is able to be moved towards the die holder;
    inserting the punch into the punch holder;
    inserting the die into the die holder;
    transferring the punch holder along the guide into a measuring position in which the punch rests on a surface of a measurement object and an underside of the measurement object rests on the die;
    measuring with a measurement apparatus a distance of the punch holder from a zero point of the die holder and a distance of the measurement object from the zero point of the die holder; and
    outputting by an evaluation device at least a punch length of the punch and a die height of the die or a die height of the die arranged in a die carrier.

15. The method according to claim 14, which comprises, before the punch holder is transferred into the measuring position, pivoting a measurement object from a non-use position into the measuring position between the punch and the die.

16. The method according to claim 14, which comprises, after the punch length and the die height have been measured, moving the measurement object into the non-use position and moving the punch holder along the guide towards the die such that the measurement device measures a penetration of the punch into an opening in the die.

17. The method according to claim 14, wherein the set-up apparatus comprises a stripper holder into which a stripper is inserted and the punch holder with the inserted punch is moved along the guide to the measuring position, and wherein, while the punch holder is being moved, the main body or the adjusting element of the punch rests on the stripper and subsequently the stripper holder is moved along the guide with the punch holder.

18. The method according to claim 14, which comprises forming a tool-specific dataset from values of the tool in the set-up apparatus that are measured by the measurement device, and forwarding the dataset to a database or a cloud or to the machine tool.

19. The method according to claim 14, wherein, after the measurement of the tool has been carried out, moving the punch holder, and optionally the stripper holder, into a changing position at a distance from the die holder and locking in the changing position.

20. The method according to claim 14, which comprises providing a drawer for holding a cassette in the base frame, wherein the drawer is opened to remove the tool, in order to insert the cassette, such that, subsequently, as a result of the drawer being closed, the cassette engages with the tool and the tool is retained fixedly in the cassette, such that the cassette with the tool is removed as a unit from the drawer.

* * * * *